(12) United States Patent
Bosley et al.

(10) Patent No.: US 6,675,063 B2
(45) Date of Patent: Jan. 6, 2004

(54) APPARATUS AND METHOD FOR CALIBRATING MULTI-GRIPPER EQUIPPED ACCESSOR IN AN AUTOMATED DATA STORAGE LIBRARY

(75) Inventors: Jonathan Edward Bosley, Tucson, AZ (US); Brian Gerard Goodman, Tucson, AZ (US); Jeffrey Lawrence Thorn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/100,619

(22) Filed: Mar. 18, 2002

(65) Prior Publication Data

US 2003/0187544 A1 Oct. 2, 2003

(51) Int. Cl.⁷ .................... G06F 7/00; G05B 19/04; G05B 19/18; G05B 15/00; G05B 19/00
(52) U.S. Cl. ............... 700/218; 700/214; 700/254; 700/259
(58) Field of Search ................... 700/213, 214, 700/218, 254, 259; 360/91, 92; 901/46, 47

(56) References Cited

U.S. PATENT DOCUMENTS

| | | | |
|---|---|---|---|
| 3,831,197 A * | 8/1974 | Beach et al. ............... 360/71 |
| 4,654,727 A * | 3/1987 | Blum et al. ............... 360/71 |
| 4,864,511 A * | 9/1989 | Moy et al. ............... 700/218 |
| 4,908,777 A | 3/1990 | Wolfe | |
| 5,303,034 A | 4/1994 | Carmichael et al. | |
| 5,323,327 A | 6/1994 | Carmichael et al. | |
| 5,740,061 A * | 4/1998 | Dewey et al. ............... 700/214 |
| 5,872,751 A * | 2/1999 | Utsumi et al. ............ 369/30.29 |
| 5,914,919 A | 6/1999 | Fosler et al. | |
| 5,956,301 A * | 9/1999 | Dimitri et al. ............... 700/214 |
| 6,005,734 A * | 12/1999 | Shimada et al. ............... 360/69 |
| 6,115,648 A | 9/2000 | Gallo | |
| 6,438,448 B1 * | 8/2002 | Manes et al. ............... 700/218 |
| 6,493,604 B1 * | 12/2002 | Kappel et al. ............... 700/213 |

* cited by examiner

Primary Examiner—Gene O. Crawford
(74) Attorney, Agent, or Firm—Scully, Scott, Murphy & Presser; Jean M. Barkley, Esq.

(57) ABSTRACT

An apparatus for calibrating a multi-gripper equipped accessor in an automated data storage library. More particularly, an apparatus for calibrating a multi-gripper equipped accessor in an automated data storage library, includes at least one additional sensor to calibrate each gripper. Also described is a method for calibrating a multi-gripper equipped accessor in an automated data storage library, wherein one or more additional grippers are calibrated to reduce the effect of tolerances in the system.

14 Claims, 5 Drawing Sheets

APPARATUS AND METHOD FOR CALIBRATING MULTI-GRIPPER EQUIPPED ACCESSOR IN AN AUTOMATED DATA STORAGE LIBRARY

BACKGROUND OF THE INVENTION

1. Field of the Invention

The present invention relates to an apparatus for calibrating a multi-gripper equipped accessor in an automated data storage library. More particularly, the invention is directed to an apparatus for calibrating a multi-gripper equipped accessor in an automated data storage library, wherein each gripper is calibrated to reduce tolerances in the system. Moreover, the invention is further directed to a method for calibrating a multi-gripper equipped accessor in an automated data storage library, wherein one or more additional grippers are calibrated in relation to the original calibration of a first gripper. In addition, the invention also contemplates the provision of an apparatus with multiple grippers in which each gripper is capable of being calibrated independently of the other gripper or grippers.

In the data processing technology, automated data storage libraries are frequently utilized for the storage of various data media which are employed in data processing systems. Generally, such data processing systems necessitate the provision of considerable amounts of data storage capacity which, upon occasion, may be needed rapidly, and stored in memory and hard disk drives, and whereby the various data may not be necessarily provided in a rapid manner. Consequently, data which is not required to be employed in an immediate manner may constitute frequently accessed data whereby the storage thereof may be in removable data storage media, such as magnetic tape cartridges, optical disk cartridges or the like, which are stored in automated data storage libraries.

Ordinarily, such libraries provide an adequate amount of access to considerable quantities of the data storage media, the latter of which are generally stored in storage shelves and are accessed by one or more accessors and delivered by therewith associated grippers or pickers to data storage drives in the automated data storage libraries. Potentially, an automated data storage library may store in excess of 6,000 cartridges, which although not frequently accessed, may be needed rapidly at certain times. Basically, the accessors for conveying and transferring the data storage media, for example; such as storage automation devices in the form of as the 3584 Ultra Scalable Tape Library (a registered ™ of IBM), employ cartridge and handling assemblies which are frequently referred to as either grippers or pickers in the technology. These electromechanical devices, in effect will grab or engage a cartridge for transport from one location to another whereby some type of calibration sensor is frequently mounted on the cartridge gripper so as to be able to measure the relationship between the theoretical position and the actual position of the gripper. This, in essence, reduces the numerous physical tolerances encountered in the construction and functioning of the automatic data storage library, and as a result reduces structural and operating expenditures, while concurrently improving upon the reliability in the handling and transporting of the tapes.

Some currently installed automated data storage libraries utilize an accessor having a single gripper or cartridge picker having some form of calibration sensor mounted thereon, various libraries employ two or even greater numbers of grippers for redundancy or for handling different types of cartridges and data storage media. This type of design entails being subjected to higher degrees of physical tolerance and necessitates the application of special design considerations inasmuch as, generally, a calibration sensor can normally be only used in being physically and operatively associated with a single one of the grippers of the multiplicity of grippers.

2. Discussion of the Prior Art

Although various types of automated storage libraries have been developed for use in the data storage technology, these are generally still subject to limitations in providing the necessary designs adapted to reduce tolerances and to take cognizance of the various design considerations due to the installation of calibration sensors operatively associated with only a single gripper in a multi-accessor and gripper automated data storage library system.

Gallo U.S. Pat. No. 6,155,648, which is commonly assigned to the assignee of the present application, discloses a system and a method for the non-invasive accessor recalibration of a data storage library, in conjunction with multiple targets such as fiducials, media storage cells and one or more media drives provided with the library. A storage unit which contains stored coordinates aligns an accessor with the targets, wherein one of the fiducials is predefined as a master fiducial. Upon recalibrating, the assessor is used to determine new master coordinates which currently define the master fiducial, and a positional difference is derived between the new master coordinates and the stored coordinates in the master fiducial. This may be implemented in conjunction with suitable sensing structure associated with the accessor for recalibration thereof.

Fosler, et al. U.S. Pat. No. 5,914,919, which is commonly assigned to the assignee of the present application, discloses an arrangement and a method for rapidly switching to a second accessor upon the failure of a first accessor in an automated data storage library. Consequently, each of the first or second accessors may be selectively designated as an active accessor and the other as a standby accessor, and wherein suitable switches are provided to operate the second accessor; as the active accessor which allows maintenance and servicing of the first accessor simultaneously with operation of the second accessor.

Carmichael et al. U.S. Pat. No. 5,323,327, discloses a method and apparatus for on-the-fly cataloging of library cell contents in an automatic robotic tape library, which enables the decoupling of a robotic arm motion/tape cartridge label scanning process from the image processing software/hardware. This not only facilitates reading of the tape cartridge labels at maximum camera line speed, but facilitates the use of robotic arm calibration data to be read on-the-fly so as to allow for continual and rapid verification and calibration of robotic arm positioning. In essence, the automatic data storage library in this publication utilizes only a single accessor for manipulating the data storage media.

Similarly, Carmichael et al. U.S. Pat. No. 5,303,034 describes a robotic arm calibration system for a single accessor employed with a video line scan camera vision system in conjunction with a plurality of novel targets in an automated tape storage library. This type of data which is provided enables calculation of reference point on the robotic arm with respect to each other to thereby obtain precise robotic arm calibration in relation to the library system work space. Again, this only relates to a single accessor being utilized in conjunction with an automatic data storage library system.

Finally, Wolfe U.S. Pat. No. 4,908,777 relates to a robot arm calibration system for an automatic data storage library and retrieval system wherein actual locations are different from expected or theoretically ideal locations due to tolerances of the structure encountered in the components and assembly thereof. Consequently, a bar code scanner which may be utilized to read the identity of items storage in the system, is adapted to locate and scan each target, and transmit to a control a specific message containing precise information to enable calibration adapted to compensate for any offset in the bar code scanner.

Although the foregoing prior art publications each to various degrees describe the calibration of various accessors, such as robotic arms or the like employed in automatic tape data libraries so as to be able to compensate for tolerances encountered in the various components and in the assembly thereof, none of these enable the reduction of tolerances in any significant degrees in the employment of an automated data storage library in which there are utilized at least two grippers or pickers on a single accessor as constituents of storage media or cartridge handling assemblies.

Although, in these particular automated data storage library systems, it is known to utilize multiple or dual grippers or pickers as constituents of cartridge handling assemblies, presently only a single gripper of a multiple gripper assembly is equipped with a sensor which will facilitate the calibration of the various grippers.

SUMMARY OF THE INVENTION

The present invention is intended to clearly provide for advantageous structure and operative improvements over currently employed automated data storage libraries and systems through the implementation of dynamic offset calibration of a multiple cartridge handling arrangement or device in that additional calibration sensors are mounted on any additional grippers, enabling an offset calibration process to be implemented in order to decrease the effect of any tolerance differences between a first gripper and any subsequent or additional grippers. This type of construction with the addition of the further sensors associated with each additional gripper, in addition to the sensor which is provided on the initial gripper provides the unique advantages in that higher tolerances may be accommondated between the grippers This essentially results in a simplified assembly which reduces the potential of any scrap or damage, and which lowers the cost of construction and operation of the overall library system. Thus, a single field replaceable unit (FRU) which contains the gripper and associated calibration sensor results in fewer parts to manage in the field and allows for a manufacturing alignment procedure between the gripper and the calibration sensor if this becomes necessary.

There is also afforded the potential for calibrating each sensor of each gripper independently of each other. Moreover, it is also possible to calibrate one gripper and then to derive the relationship between the one gripper and a second or further grippers relative to specific locations in the data storage library.

A typical calibration procedure currently employed in the technology involves a single calibration sensor being mounted on a gripper of an accessor. The gripper is positioned so as to be directable to various targets in the library and each one is calibrated. The resulting data allows the library to know exactly where various components, or sections, of the library reside in relation to the gripper with a high degree of accuracy. This process eliminates or reduces many tolerances and errors which are encountered in she entire mechanical system of the library.

When two or more grippers are used, the mechanical tolerances between the grippers must be controlled. In actual practice, this can be difficult, to achieve, and often renders the equipment expensive to produce. For example, the multiple grippers employing a single calibration sensor, and any associated mounting hardware, can be a single replaceable part which is aligned at a manufacturing site. This type of construction can lead to very expensive replacement parts which conceivably would increase service and warranty costs, and in the event that storage data media which may be concurrently of different types, such as magnetic tape cartridges or cassettes, optical disc cartridges of diverse types, ROM, WORM, RAM, hard disk PROM, and rewritable in numerous variations and form etc, were to be supported by the library, then the number and proportionate costs of these expensive parts increase considerably. In contrast with the foregoing the inventive apparatus and method involves the possibility of installing calibration sensors on each gripper, and whereby each gripper is run through the library calibration procedure. The foregoing eliminates the need for tighter tolerances within the gripper mounting assembly. Moreover, also eliminated is the need for aligning each gripper separately during manufacture or upon being repaired. This, in effect, would considerably increase the calibration time needed for additional grippers in being run through the library calibration procedure. In addition, rendering every calibration target visible to every gripper sensor could lead to storage capacity reductions in the automated data storage library. Another option involves calibrating the entire library with one gripper sensor and then calibrating one or more targets with any additional gripper sensors so as to measure the relationship between the first gripper and any additional grippers.

In order to achieve the advantages as contemplated by the invention, the accessor for the automated data storage library system includes at least two or dual gripper handling devices, wherein each gripper device has a calibration sensor, for example, such as an optical sensor or barcode reader, mounted in operative association therewith. Pursuant to the invention, the sensor of the first gripper handling device is designed to calibrate the entire data storage library, with the sensor of the second or any additional gripper handling device calibrating one or more specific targets so as to measure the relationship between the first gripper and the second gripper. This, in effect, will result in a considerable reduction in the tolerances of the system components thereby rendering the manufacture and dynamic offset calibration operation of the library system highly efficient and cost effective.

However, instead of this procedure, it is also possible to calibrate each gripper of the plurality of grippers independently of each other in order to be able to attain the required reduction in tolerances and accuracy in the operation thereof.

Accordingly, it is an object of the present invention to provide a dynamic offset calibration arrangement for a multiple cartridge handling device of an automated data storage library, which takes into consideration the effects in tolerance differences between grippers of the device.

Another object of the invention resides in the provision of a dual gripper handling device having a calibration sensor mounted on each gripper so as to enable a first gripper sensor on a first gripper to calibrate an entire automated data storage library and a second gripper sensor on a second gripper to calibrate a target to decrease the tolerance difference effects between the first gripper and the second or any additional grippers.

Yet another object of the invention is to provide a method of dynamic offset calibration for a multiple cartridge handling device of an automated data storage library.

A further object of the invention resides in the provision of a method in which a dual gripper handling device of an automated data storage library has a calibration sensor mounted on each gripper so as to enable a first sensor on a first gripper to calibrate the entire library and a second sensor on a second or additional gripper to calibrate a target to measure the relationship between first gripper and the second or any additional grippers.

A still further object of the invention resides to the provision of a method whereby my gripper may be calibrated with regard to any fixed location in the automated data storage library.

Pursuant to a further object of the invention there is provided a method whereby each sensor of each gripper of the multi-gripper arrangement may be calibrated independently of each other.

According to another object of the invention there is provided a method of calibrating one gripper and to define the relationship between at least a second gripper and the one gripper in order to better be able to locate each gripper relative to specific locations in the automated data storage library.

BRIEF DESCRIPTION OF THE ACCOMPANYING DRAWINGS

Reference may now be made to the following detailed description of a preferred embodiment of the invention, taken in conjunction with the accompanying drawings; in which.

DETAILED DESCRIPTION OF A PREFERRED EMBODIMENT

Figure 1:
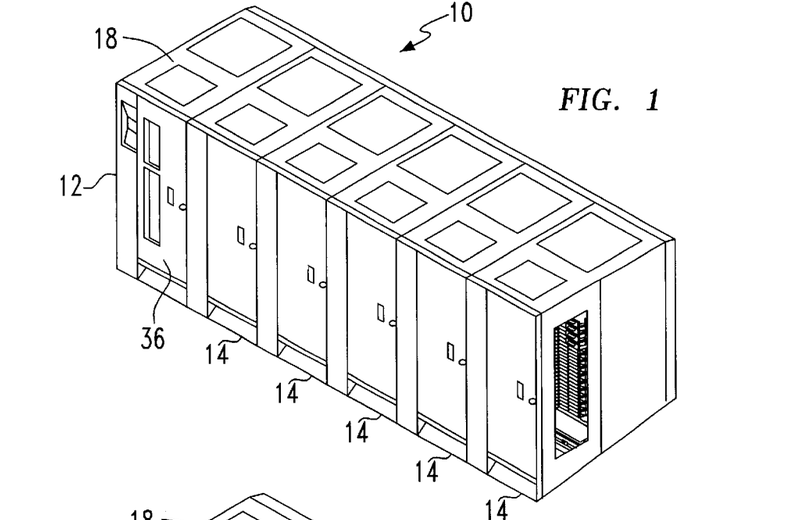
FIG. 1 illustrates a perspective view of a six-frame automated data storage library with the upper and lower I/Os shown installed therein.

Referring in particular to FIG. 1 of the drawings, there is illustrated the assembly of a typical 6-frame automated data storage library 10 with the upper and lower I/Os having been installed therein. The 6-frame library 10, as also detailed in FIG. 2 through 5, may consist of a single so-called L-frame 12 and up to 5 so-called D-frames 14, of which one is represented in FIG. 5 of the drawings. This type of library system is generally disclosed in U.S. Pat. No. 5,914,919, commonly assigned to the present assignee, and the disclosure of which is incorporated herein by reference.

Figure 2:
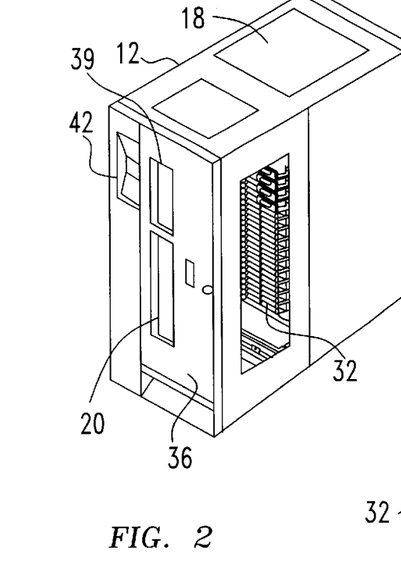
FIG. 2 illustrates a perspective view of an L-frame of an automated data storage library.
Figure 3:
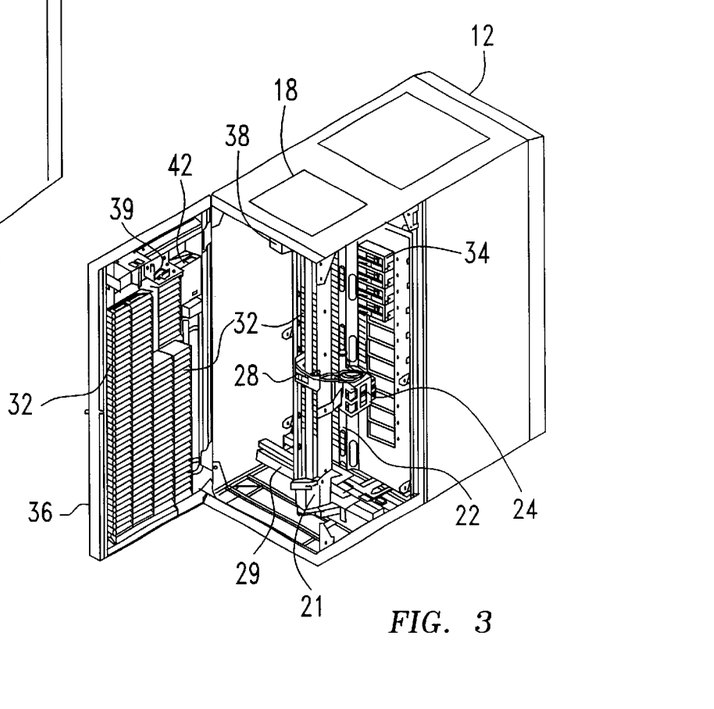
FIG. 3 illustrates a perspective view of the front view of the L-frame of FIG. 2 with the door shown in an opened position, and with no lower I/O installed.
Figure 4:
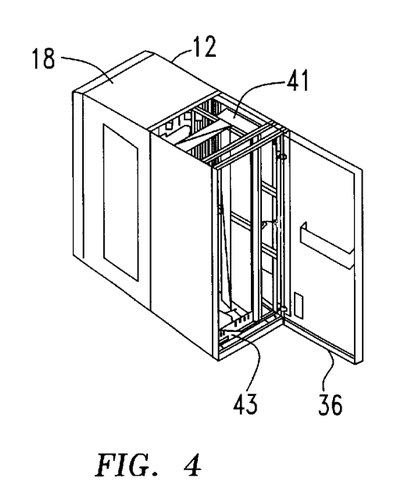
FIG. 4 illustrates the rear view of the L-frame of FIG. 2 with the rear door shown in the opened position.
Figure 5:
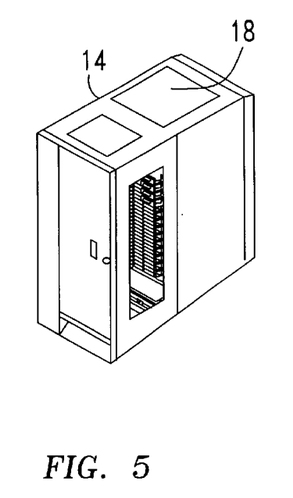
FIG. 5 illustrates a perspective front view of a D-frame of an automated data storage library, shown separate from the L-frame of FIG. 2.

The L-frame 12, as shown in FIGS. 2, 3 and 4 of the drawings, contains an operator panel 42, an upper I/O 39, an optional lower I/O 20, an accessor 21, storage slots 32, grippers 24 and drives 34. In contrast, the D-frame 14 which is shown in FIG. 5 may contain all of the items of data storage, in effect, the data tapes or the like media, storage slots, and may contain additional drives.

Figure 7:
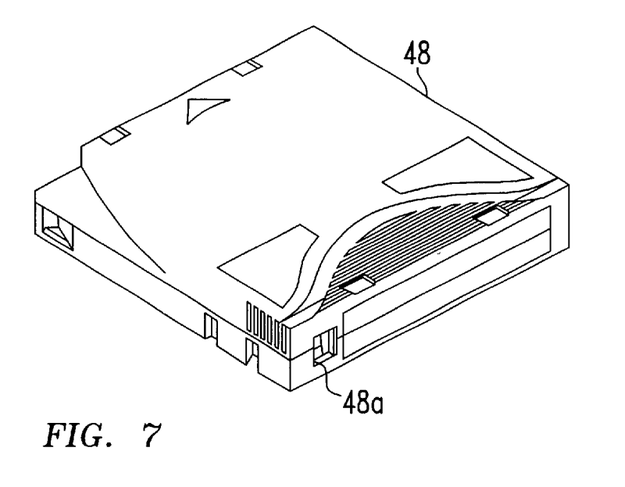
FIG. 7 illustrates a perspective view of an LTO cartridge.
Figure 8:
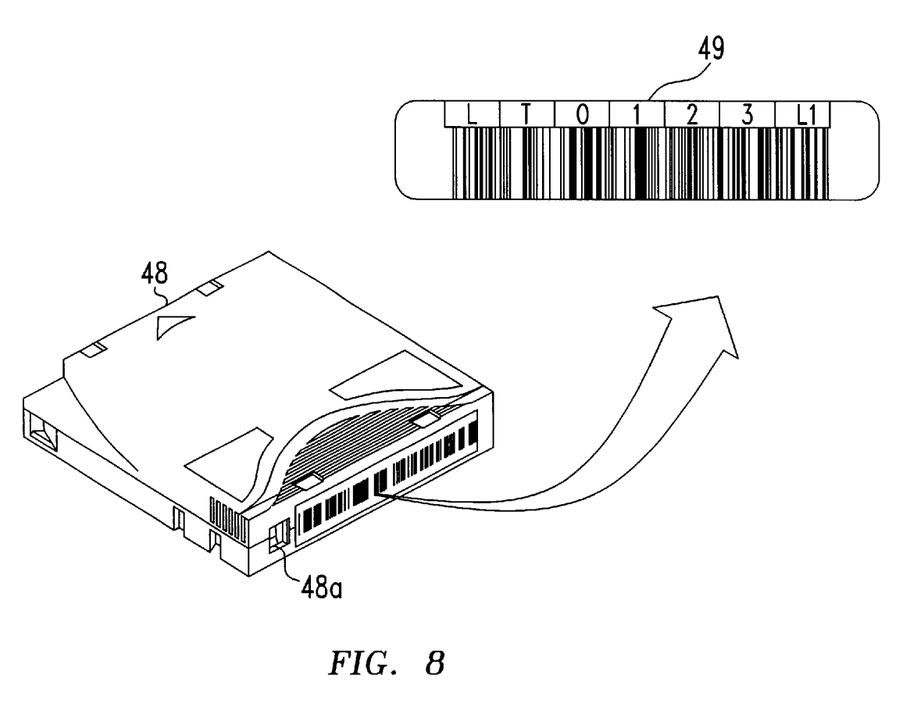
FIG. 8 illustrates a perspective view of the LTO cartridge of FIG. 7, with the label emplacement thereof shown on an enlarged scale.

Reverting to FIGS. 3 and 4, illustrating respectively front and rear perspective views of the L-frame 12 of FIG. 2, as shown in the assembled 6-frame library 10 of FIG. 1, there is illustrated the top 18 of the frame 12. Furthermore, the drawings disclose a cable guide 22. Furthermore, a gripper cage 24 is provided for two grippers, in this instance with the invention being directed to a dual gripper assembly or device. In the frame 12 there is also illustrated a Y-rail 28, and X-rail 29, as well as the storage slots 32 for data tapes 46 (FIG. 6) and 48 (FIGS. 7 and 8).

Four of the drives 34 (12 may be possible for each frame) are illustrated. A front door 36 of the frame 12 includes a door switch 38.

Also disclosed is the component 41 which contains the A/C power input, power distribution and the like, and also provided is a fiber channel (FC-AL) patch panel 43, as is well known in the technology.

Figure 6:
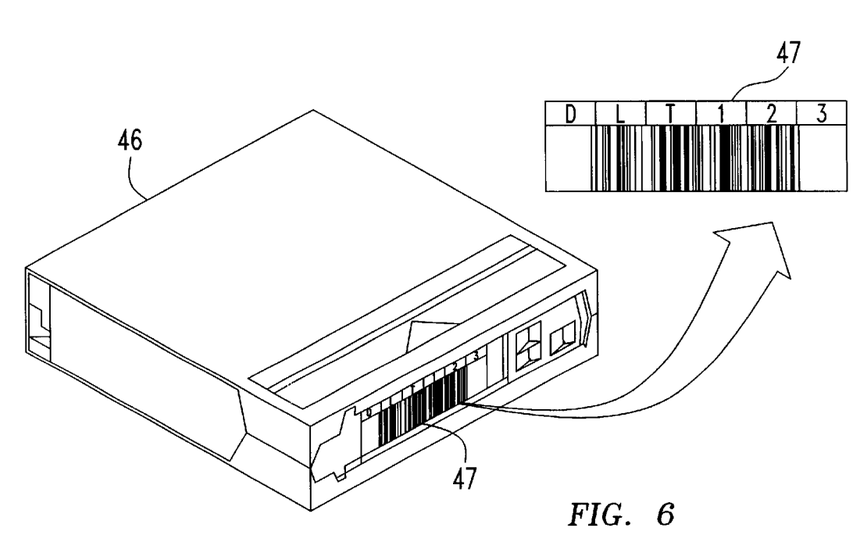
FIG. 6 illustrates a perspective view of a DLT (a registered ™ of Quantum Corporation) cartridge, with the label emplacement thereof shown on an enlarged scale.

Referring to FIG. 6, there is illustrated a typical DLT cartridge 46, with label placement 47 shown on an enlarged scale, such as may be stored in the automated data storage library 10.

Similarly, as shown in FIG. 7, there is represented a typical LTO cartridge 48 with a write-protection tab 48a, and as represented in FIG. 8, with label placement 49.

Other types of data storage media, which may be concurrently of multiple types, for example, such as magnetic tape cartridges or cassettes, optical disk cartridges of diverse types, ROM, WORM, RAM, hard drive, PROM, and rewritable in numerous variations and formats are equally employable in connection with the automated data storage library 10 as disclosed and elucidated herein.

Figure 9:
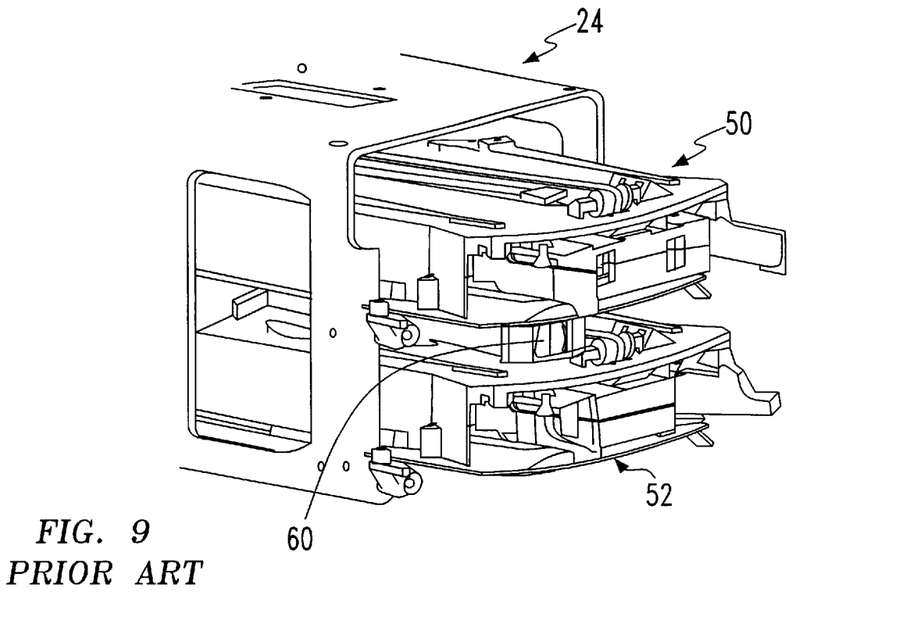
FIG. 9 illustrates a pair of gripper components of a dual gripper handling device for a calibration sensor as employed in connection with the automated data storage library, with the calibration sensor mounted on an upper gripper in accordance with the prior art.

As illustrated in FIG. 9 of the drawings, in which the automated data storage library 10, as shown in FIG. 3 of the drawings, comprises LTO gripper 50 and a DLT gripper 52, in effect, incorporating a dual gripper handling cage 24, comprises a gripper mounting structure pursuant to, the prior art, the upper gripper 50 including a calibration sensor 60, whereas the lower gripper 52 depends for calibration on the basis of the sensor 60 which is a component of the upper gripper 50.

Figure 10:
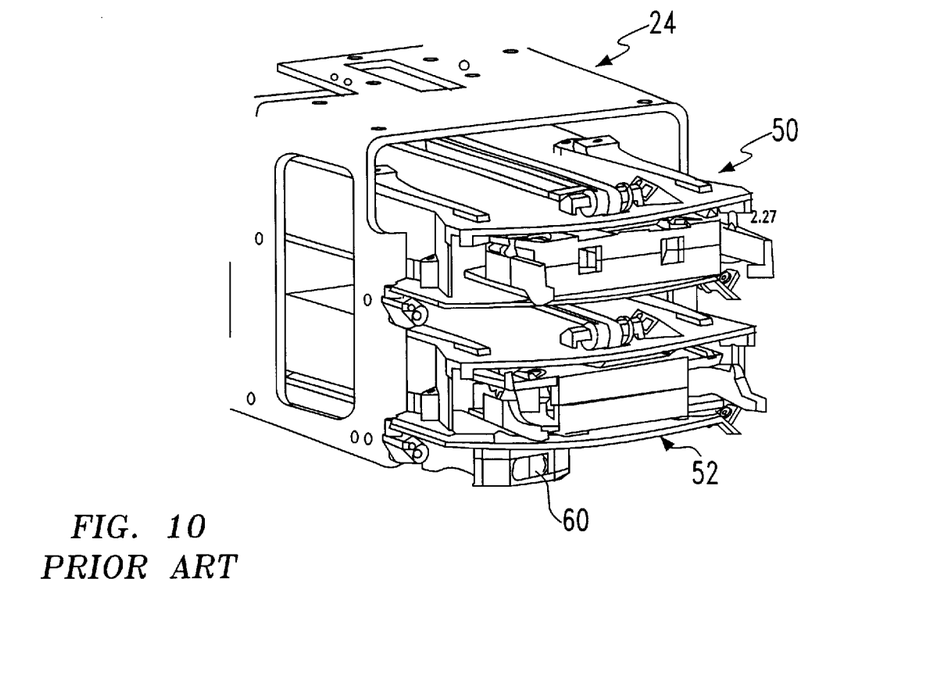
FIG. 10 illustrates, in a view similar to FIG. 9, the dual gripper handling device with the calibration sensor mounted under a second or lower gripper.

Similarly, pursuant to the prior art as shown in FIG. 10, the use of the dual gripper arrangement 50, 52, has the calibration sensor 60 mounted below the lower or second gripper 52, whereby the upper gripper 50 is now dependent upon calibration by means of the sensor 60 of the lower gripper 52.

The foregoing constructions pursuant to FIG. 9 and 10 require, in essence, a high degree of manufacturing precision in order to accurately locate the non-calibrated gripper. This high degree of precision may result in higher manufacturing costs and may still be inadequate as far as the desired accuracy in calibration in handling of the automated data storage library system 10 is to be effected.

Figure 11:
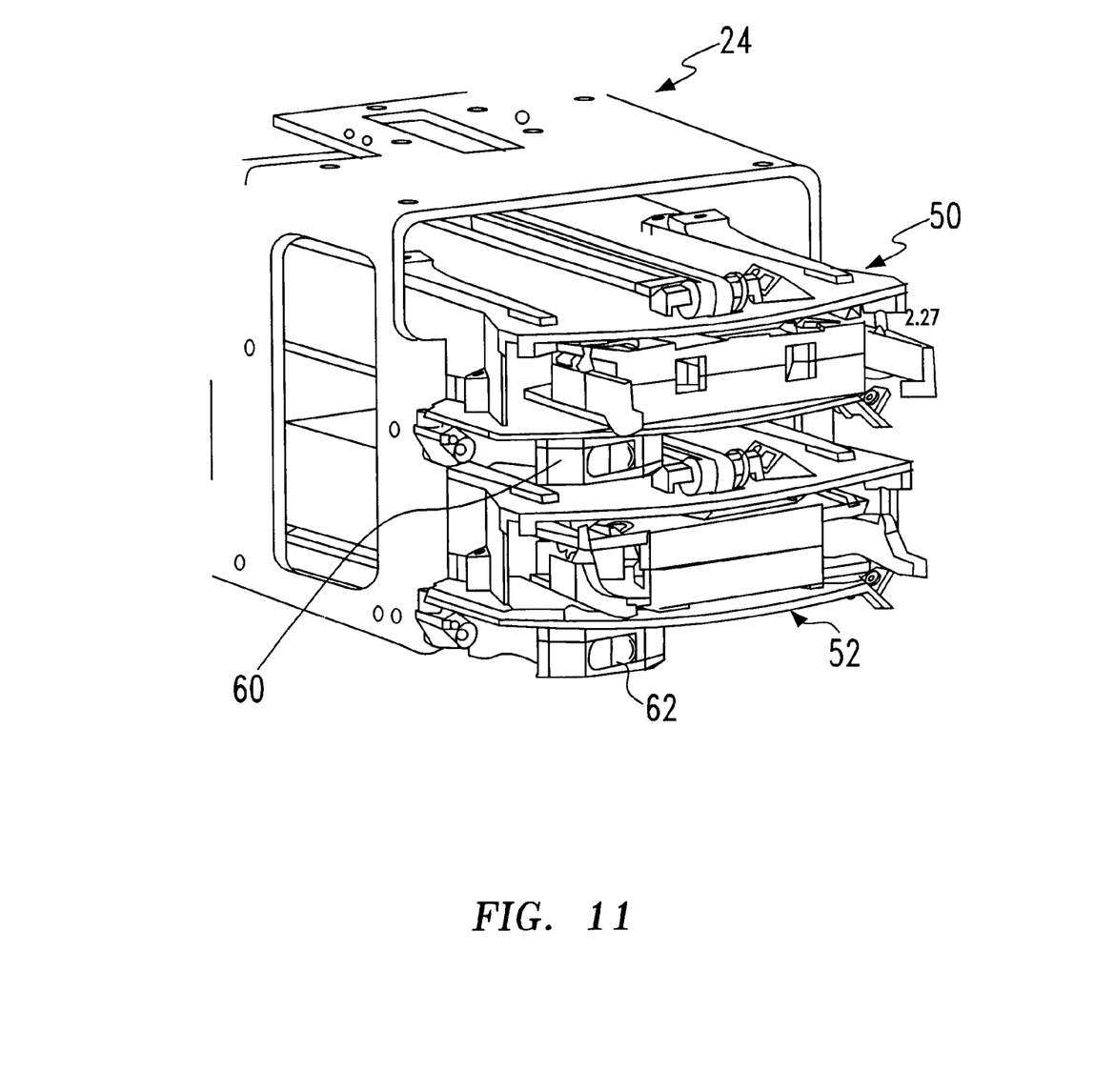
FIG. 11 illustrates the dual gripper handling device, with each of the grippers possessing an associated calibration sensor pursuant to the present invention.

To the contrary, pursuant to the present invention, as illustrated in FIG. 11 of the drawings, each gripper 50, 52 is operatively associated with, respectively, its own calibration sensor 60, 62. Thus, the entire automated data storage library 10 is calibrated through the intermediary of the sensor 60 of the first gripper 50, whereas any one or more targets are calibrated through the additional sensor 62 of the other gripper 52, or a plurality of sensors providing there are more than two grippers installed in the library 10. This method reduces the effects of tolerances between the calibration sensor 60 of first gripper 50 and any sensor 62 of additional gripper or grippers 52, and thereby clearly reduces any tolerances encountered in the construction and functioning of the entire library system 10.

As indicated hereinabove, it is also possible to calibrate each of the grippers 50, 52 independently of each other, rather than with regard to their relationship. Furthermore, alternatively, it is also contemplateable that any part of the library 10 is calibrated with one sensor, and another part of the library with another sensor or other parts with further additional sensors.

Although the sensors 60 and 62 have been represented as being mounted below each therewith associated respective grippers 50, 52, within the scope of the invention, the sensor can be mounted on the top, sides or within the confines of the grippers.

From the foregoing it becomes readily apparent that the invention is directed to an inexpensive modification of and improvement upon existing automated data storage library systems which, at minimal expenditures beyond that currently encountered in the prior art, enables a clear reduction in the tolerances between the grippers 50, 52 resulting in an efficient assembly reducing the potential for scrap and lowering expenditures.

While the invention has been particularly shown and described with respect to preferred embodiments thereof, it will be understood by those skilled in the art that the foregoing and other changes in form and details may be made therein without departing from the spirit and scope of the invention.

What is claimed is:

1. An automated data storage library, comprising:
    a plurality of storage shelves for storing data storage media;
    an accessor for moving said data storage media to and from said plurality of storage shelves;
    at least two grippers mounted on said accessor for selectively accessing said data storage media in said plurality of storage shelves;
    a first one of said grippers having a first sensor operatively associated with said first gripper for calibrating the relationship between said first gripper and one or more locations within said automated data storage library; and
    a second gripper of said at least two grippers having a second sensor operatively associated with said second gripper for calibrating the relationship between said second gripper and one or more locations within said automated data storage library and wherein said first and second calibration sensors are further used to determine the relationship between said first and second grippers.

2. An automated data storage library as claimed in claim 1, wherein said first calibration sensor is mounted on said first gripper.

3. An automated data storage library as claimed in claim 1, wherein said first and second calibration sensors read barcoded labels located on said data storage media.

4. An automated data storage library as claimed in claim 1, wherein said data storage media are selected from the group of media consisting of magnetic tape cartridges, cassettes, optical disk cartridges, ROM, WORM, RAM, hard drive PROM, and rewritable data media.

5. An automated data storage library as claimed in claim 1, wherein said first and second calibration sensors are each optical sensors.

6. An automated data storage library as claimed in claim 1, wherein said first and second calibration sensors are each barcode readers.

7. An automated data storage library as claimed in claim 1, wherein said at least two grippers are calibrated independently of each other.

8. A method of calibrating an automated data storage library, comprising:
    providing a plurality of storage shelves storing data storage media;
    providing an accessor for moving said data storage media to and from said plurality of storage shelves;
    providing at least two grippers mounted on said accessor for selectively accessing said data storage media in said plurality of storage shelves;
    a first one of said grippers having a first sensor operatively associated with said first gripper for calibrating the relationship between said first gripper and one or more locations within said automated data storage library; and
    a second gripper of said at least two grippers having a second sensor operatively associated with said second gripper for calibrating the relationship between said second gripper and one or more locations within said automated data storage library and wherein said first and second calibration sensors are further used to determine the relationship between said first and second grippers.

9. A method of calibrating an automated data storage library as claimed in claim 8, wherein said first calibration sensor is mounted on said first gripper.

10. A method of calibrating an automated data storage library as claimed in claim 8, wherein said first and second calibration sensors read barcoded labels located on said data storage media.

11. A method of calibrating automated data storage library as claimed in claim 8, wherein said data storage media are selected from the group of media consisting of magnetic tape cartridges, cassettes, optical disk cartridges, ROM, WORM, RAM, hard drive PROM, and rewritable data media.

12. A method of calibrating an automated data storage library as claimed in claim 8, wherein said first and second calibration sensors are each optical sensors.

13. A method of calibrating an automated data storage library as claimed in claim 8, wherein said first and second calibration sensors are each barcode readers.

14. A method of calibrating an automated data storage library as claimed in claim 8, wherein said at least two grippers are calibrated independently of each other.

* * * * *

UNITED STATES PATENT AND TRADEMARK OFFICE
CERTIFICATE OF CORRECTION

PATENT NO. : 6,675,063 B2
DATED : January 6, 2004
INVENTOR(S) : Jonathan E. Bosley et al.

It is certified that error appears in the above-identified patent and that said Letters Patent is hereby corrected as shown below:

Column 5,
Line 16, "my" should read -- any --

Signed and Sealed this

Twentieth Day of April, 2004

JON W. DUDAS
*Acting Director of the United States Patent and Trademark Office*